Oct. 9, 1962 G. L. CLAPPER 3,058,008

AMPLITUDE DISCRIMINATOR CIRCUIT

Filed Nov. 26, 1958

INVENTOR
GENUNG L. CLAPPER

BY G. R. Gugger

AGENT

United States Patent Office 3,058,008

Patented Oct. 9, 1962

3,058,008

AMPLITUDE DISCRIMINATOR CIRCUIT

Genung L. Clapper, Vestal, N.Y., assignor to International Business Machines Corporation, New York, N.Y., a corporation of New York Filed Nov. 26, 1958, Ser. No. 776,533

3 Claims. (Cl. 307—88.5)

This invention relates generally to a gated transistorized core sensing amplifier and more particularly to a noise discrimination circuit prior to amplifying and gating.

The correct sensing of the output of a core array, for example, involves discrimination against noise which may be of considerable amplitude. The circuit in the present invention performs the function of noise discrimination before amplification on a level and polarity basis. Polarity and level discrimination is provided by means of two direct coupled transistors, the first having a base input circuit for receiving the combined noise and signals. This first transistor is an emitter follower having a grounded collector, its output voltage being taken from its emitter circuit and applied to the input emitter of the second transistor, which is a grounded base amplifier. A diode in the input circuit to the emitter follower transistor rejects all negative noise signals and allows both positive noise and information signals to appear at the emitter of the first transistor. However, since the worst noise signal in a positive direction is several tenths of a volt below the minimum information signal, the base of the amplifier transistor is biased at an intermediate level so that only voltages (i.e., signals) above this intermediate value will be amplified by the second transistor. Means are also provided for establishing a threshold level for the transistors from a remote point which is not associated in any way with the input.

The output from the collector of the amplifier is clamped to produce a "clean" signal and then applied to an emitter follower output driver which is gated for time selection. Direct coupling is used throughout so that recovery times are negligible. By this means, a clean, uniform correctly timed output is produced from an input waveform heavily adulterated with noise.

Accordingly, a principal object of the present invention is to provide a transistor amplifier circuit for producing a clean, uniform correctly timed output from an input waveform heavily adulterated with noise.

A further object of the present invention is to provide a gated transistorized amplifier for sensing the output of a core array, or the like.

A still further object of the present invention is to provide a gated transistorized core sensing amplifier having a noise discrimination circuit prior to amplifying and gatng.

A still further object of the present invention is to provide a transistorized amplifier having a noise discrimination circuit which includes means for establishing a threshold level for the transistors from a remote point which is not associated with the input.

Other objects of the invention will be pointed out in the following description and claims and illustrated in the accompanying drawing, which discloses, by way of example, the principle of the invention and the best mode, which has been contemplated, of applying that principle.

Figure 1:
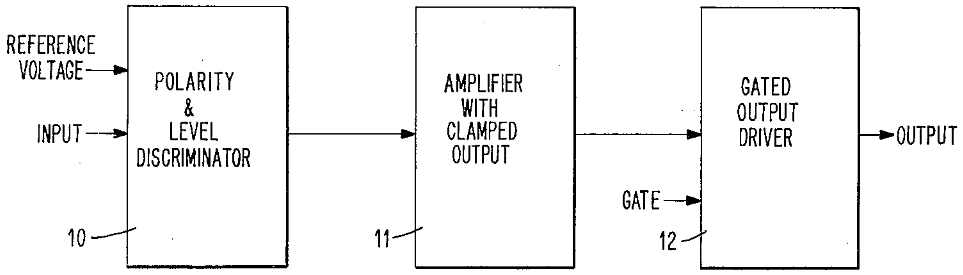
FIG. 1 is a block diagram illustrating the arrangement of the discriminator, amplifier and output driver of the present invention.

Referring to the schematic showing in FIG. 1, it may be seen that the input waveform along with a reference voltage are applied to a polarity and level discriminator circuit indicated by the block 10 where, as will be seen, negative noise signals will be rejected and positive noise and information signals received. The discriminator circuit then functions to select out only those voltage signals which are above an intermediate value between the worst noise signal in a positive direction and the minimum information signal and to transmit said selected signals to an amplifier and clamp circuit indicated by the block 11. After amplification and clipping the resulting clean signal is applied to a gated output driver circuit indicated by the block 12 to produce a uniform correctly timed output.

Figure 2:
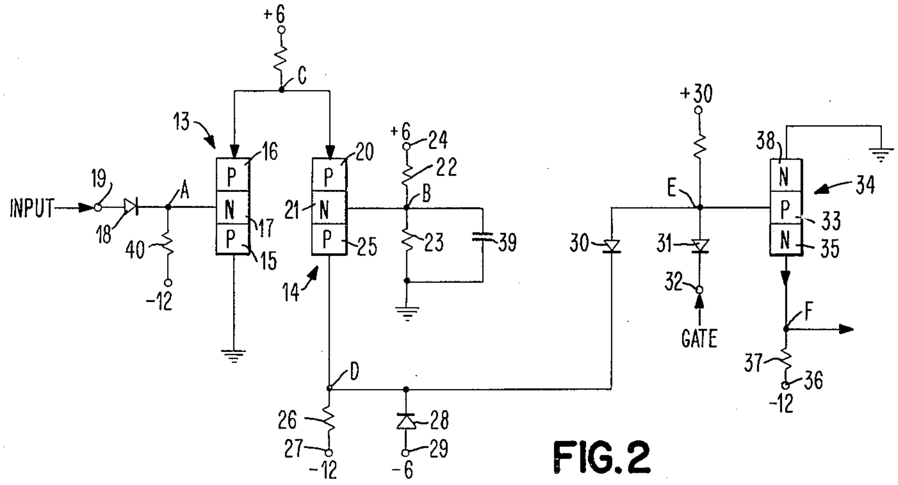
FIG. 2 is a detail circuit showing of an embodiment of a sensing amplifier in accordance with the present invention.
Figure 3:
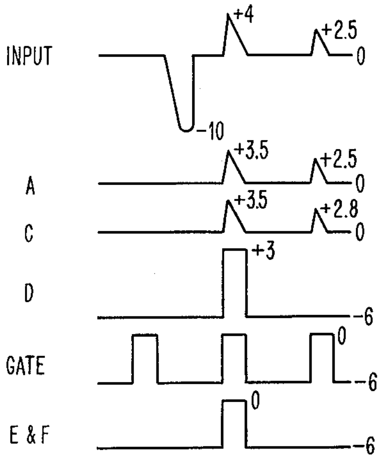
FIG. 3 is a diagram showing representative waveforms for the circuit shown in FIG. 2.

As shown in detail in FIG. 2, polarity and level discrimination is provided by means of two emitter coupled transistors 13 and 14 of the PNP junction type. The first transistor 13 has an input emitter follower configuration having its collector electrode 15 connected to a source of ground potential, its output voltage being taken from its emitter electrode 16, shown connected to a bias potential of positive 6 volts. The base electrode 17 is connected through a diode 18 to an input terminal 19 and receives the combined noise and information signals. The diode 18 in the input circuit to the emitter follower is used to reject all negative noise signals and to allow both positive noise and information signals to appear at the emitter 16. The output voltage at the emitter 16 is applied directly to the input emitter 20 of transistor 14 which has a grounded base amplifier configuration with the base electrode 21 connected to a source of ground potential. The base voltage of the amplifier is set by a voltage divider comprising the resistors 22, 23 connected between ground and a positive 6 volt terminal 24. The output signal of the amplifier is developed at the collector electrode 25 by means of resistor 26 which is connected to a negative 12 volt terminal 27. The amplifier output is clamped by means of a clamping diode 28 connected to a negative 6 volt terminal 29.

The clamped output signal from the amplifier 14 serves as one input of a diode AND circuit comprising the diodes 30 and 31. The diode 31 is shown connected to a gate pulse terminal 32 and a coincidence of an output signal at diode 30 and a gating pulse at diode 31 will result in an output pulse which is applied to the base electrode 33 of an NPN type junction transistor 34. Transistor 34 functions as an output driver and has an emitter follower configuration with the emitter electrode 35 connected to a negative 12 volt terminal 36 through an output resistor 37, and the collector electrode 38 connected to a source of ground potential.

In illustrating the operation of the circuit, an input signal is shown that is representative of the worst case conditions of signal to noise ratio. A negative going spurious pulse of 10 volts amplitude is rejected by the input diode 18, while a minimum amplitude information pulse to a positive 4 volts is passed by the diode and causes point A at the base of the PNP input emitter follower 13 to rise to at least a positive 3.5 volts in the worst case. This causes a minimum signal pulse of positive 3.5 volts at point C of the commoned emitters of the input emitter follower 13 and the PNP grounded base amplifier 14. The base voltage at point B of the amplifier is raised to positive 3 volts by the voltage divider connected to the positive 6 volt terminal 24 and a bypass capacitor 39 to ground stabilizes the level under operating conditions. Pulses at the emitter 20 of the grounded base amplifier that rise above positive 3 volts will be amplified and pulses that do not rise as high as positive 3 volts will be eliminated. The worst case noise pulse is positive 2.8 volts for the particular example shown. This assumes no drop in the diode 18 and a maximum level shift in the emitter follower of 0.3 volt. Thus, it can be seen that the minimum good signal of positive 3.5 volts is amplified, while the maximum noise signal of positive 2.8 volts is eliminated.

A maximum input signal of positive 8 volts may be received, and under these conditions, the emitter 16 of the input emitter follower remains at about positive 3.5 volts and the base 17 rises to a maximum of 8.0 volts. This prevents overdriving the grounded base amplifier 14, as the emitter follower cuts off and isolates the amplifier from the input. An input resistor 40, connected to negative 12 volts, may be chosen so as to limit the current drain on the input to 1.0 milliampere under the worst conditions of maxium input signal. The resistance of diode 18 is high for the negative input signals, limiting the current for this condition as well.

The signal appearing at the collector 25 of the grounded base amplifier is from negative 6 volts to positive 3 volts minimum and is applied to the diode 30. Coincidence of this signal at the diode 30 and the gating signal at diode 31 results in a pulse at point E which turns on the NPN emitter follower driver 34 and an output pulse of negative 6 volts to 0 volt is produced. The diodes 30 and 31 form a positive AND circuit and with point D at negative 6 volts and the Gate signal at negative 6 volts, both diodes are conducting and point E is held at negative 6 volts to bias transistor 34 off. If point D rises to positive 3 volts and the Gate signal remains at negative 6 volts, then diode 30 goes off but diode 31 remains conducting to hold point E at negative 6 volts. And if the Gate signal goes to 0 volt with point D at negative 6 volts, the diode 30 remains conducting to hold point E at negative 6 volts. However, if point D rises to positive 3 volts and the Gate signal goes to 0 volt, both diodes 30 and 31 will turn off and the potential at point E will rise to 0 volt. When point E reaches 0 volt, diode 31 will turn on and the potential at point E will be held at 0 volt which is sufficient to turn the NPN transistor 34 on. The NPN emitter follower is used to provide good rise times for setting triggers, and the like.

It will be noted that the points A, B and C are held at substantially the same potential and a threshold established or set for the amplifier from a remote point not associated with the input. Signal operation is obtained only if the threshold level is passed. Actually, it is possible to slightly exceed threshold and stil lnot get any output because a voltage threshold has been set at the input and also a current threshold due to the normally conducting diode 28. It is necessary to pass this current threshold before an output can be obtained, thus decreasing the sensitivity of the circuit to noise. Another feature of the present circuit resides in the fact that any change in the threshold level will be in the direction to increase the bias against the signal.

While there have been shown and described and pointed out the fundamental novel features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a circuit for sensing an input waveform having information signals of one polarity and noise signals of both said one polarity and the opposite polarity, polarity and amplitude discrimination means comprising a pair of transistors each having base, emitter and collector electrodes, one of said transistors being arranged as an emitter follower, a base input circuit for said one transistor including an impedance connected to the base electrode and adapted for connection with a source of potential to render the one transistor normally conducting and including a diode directly connected to the base electrode for applying input signals of said one polarity to the latter base electrode to drive the one transistor toward a lower level of conduction, the other transistor being arranged as a grounded base amplifier with its emitter eelctrode directly coupled to the emitter electrode of the one transistor, means biasing the base electrode of the other transistor to a threshold level of said one polarity which is a predetermined amount lower than the minimum information signal level to cut off the one transistor and turn on the other transistor when the emitter electrode potential exceeds the threshold level, and a current threshold means including an impedance connected to the collector electrode of the other transistor and adapted for connection to a source of potential of predetermined level and including a clamping diode connected to the latter collector electrode and adapted for connection to a source of potential lower than said predetermined level, whereby significant signals of said one polarity are produced at the latter collector electrode only when the collector current of the other transistor exceeds the current threshold.

2. The combination set forth in claim 1 wherein the means biasing the base electrode of the other transistor comprises a voltage divider having an intermediate tap connected to the latter base electrode and adapted for connection between a source of bias potential and a source of reference potential, and a capacitor connected to the tap and adapted for connection with the source of reference potential rapidly restoring the transistors to their initial operating conditions at the termination of each information signal.

3. In a circuit for sensing an input waveform having information signals of one polarity and noise signals of both said one polarity and the opposite polarity, polarity and amplitude discrimination means comprising a pair of transistors each having base, emitter and collector electrodes, one of said transistors being arranged as an emitter follower, a base input circuit for said one transistor including an impedance connected to the base electrode and adapted for connection with a source of potential to render the one transistor normally conducting and including a diode directly connected to the base electrode for applying input signals of said one polarity to the latter base electrode to drive the one transistor toward a lower level of conduction, the other transistor being arranged as a grounded base amplifier with its emitter electrode directly coupled to the emitter electrode of the one transistor, means biasing the base electrode of the other transistor to a threshold level of said one polarity which is a predetermined amount lower than the minimum information signal level to cut off the one transistor and turn on the other transistor when the emitter electrtode potential exceeds the threshold level, a current threshold means including an impedance connected to the collector electrode of the other transistor and adapted for connection to a source of potential of predetermined level and including a clamping diode connected to the latter collector electrode and adapted for connection to a source of potential lower than said predetermined level, whereby significant signals are produced at the latter collector electrode only when the collector current of the other transistor exceeds the current threshold, and a gating circuit connected to the collector electrode of the other transistor producing output pulses incident to said significant signals.

References Cited in the file of this patent

UNITED STATES PATENTS

| | | |
|---|---|---|
| 2,812,474 | Henle | Nov. 5, 1957 |
| 2,814,736 | Hamilton | Nov. 26, 1957 |
| 2,835,828 | Vogelsong | May 20, 1958 |
| 2,843,761 | Carlson | July 15, 1958 |

| | | |
|---|---|---|
| 2,880,331 | MacSorley | Mar. 31, 1959 |
| 2,884,544 | Warnock | Apr. 28, 1959 |
| 2,890,352 | Goodrich | June 9, 1959 |
| 2,949,546 | McVey | Aug. 16, 1960 |

OTHER REFERENCES

Pub. I, "Pulse-Amplitude Analysis in Nuclear Research," Part I, Nucleonics, vol. 10, No. 7, July 1952 (pages 22–23 relied on).